UNITED STATES PATENT OFFICE.

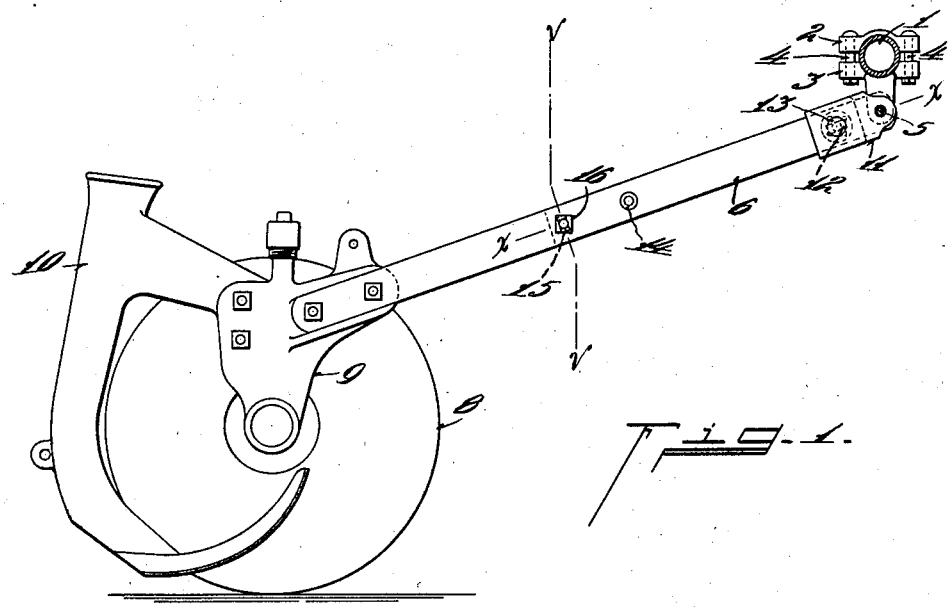
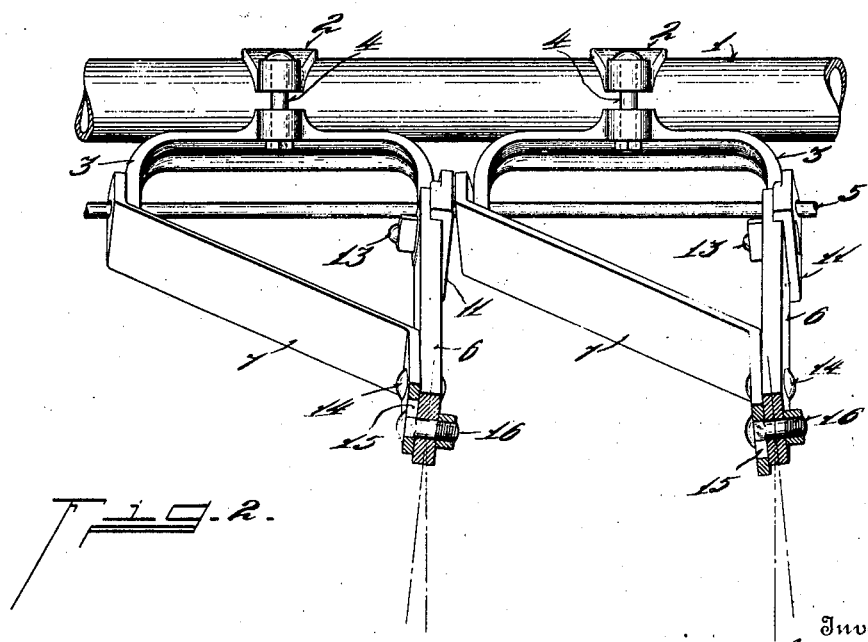

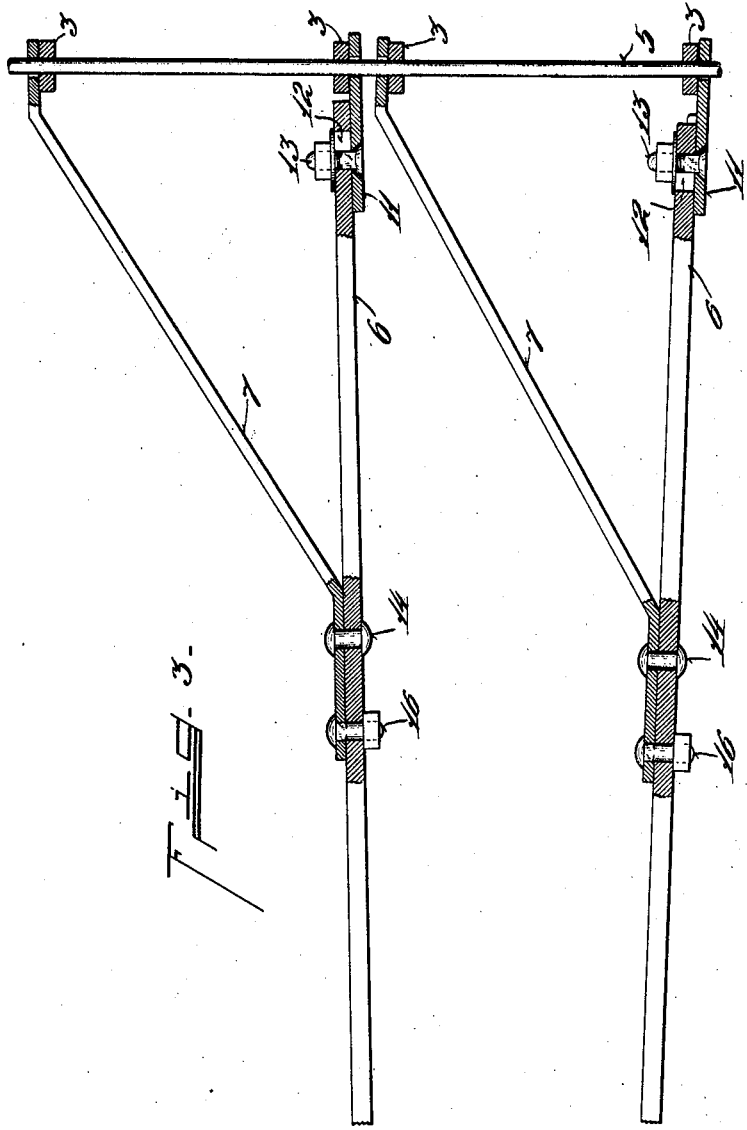

SYLVESTER H. JONES AND EDWARD CHRISTMAN, OF RICHMOND, INDIANA, ASSIGNORS TO THE AMERICAN SEEDING MACHINE COMPANY, OF SPRINGFIELD, OHIO, A CORPORATION OF OHIO.

DISK FURROW-OPENER.

1,036,252.  Specification of Letters Patent.  Patented Aug. 20, 1912.

Application filed May 29, 1911. Serial No. 630,171.

*To all whom it may concern:*

Be it known that we, SYLVESTER H. JONES and EDWARD CHRISTMAN, citizens of the United States, residing at Richmond, in the county of Wayne and State of Indiana, have invented certain new and useful Improvements in Disk Furrow-Openers, of which the following is a specification.

Our invention relates to an improvement in grain drills, and primarily in means for adjusting the drag bar or each drag bar of a series, to change the angle of the disk relative to the vertical, and the disks relative to each other.

One of the objects of our invention is to provide means for adjusting the connections between drag and brace bars for changing the angle of the disk supported upon the drag bar relatively to a vertical plane.

Another object of our invention is to provide in a grain drill means for laterally adjusting the disk end of a drag bar to vary the line of travel of the disk.

Another object of our invention is to provide a drag bar for grain drills with a brace bar attached, with means for changing the relative position of connection between said members from a coincident plane to varied degrees of angularity, whereby the disk can be angularly adjusted relative to a vertical plane.

Another object of our invention is to provide a drag bar and brace therefor, with means for changing the length between its support and brace connection for laterally adjusting said drag bar relative to its connection to vary the lines of travel of the disk for the relative spacing of a series of disks.

The features of our invention are more fully set forth in the description of the accompanying drawings, forming a part of this specification, in which :—

Figure 1 is a side elevation of a disk drag bar and grain conduit pivotally connected to a suitable support of a grain drill, the drawing illustrating the drag bar support in section. Fig. 2 is a section on line *v*, *v*, Fig. 1, through a series of disk drag bars, with the drag bars adjusted in different angular positions. Fig. 3 is an enlarged section on line *x*, *x*, Fig. 1, showing a series of drag bars in differently adjusted relative lateral planes.

In the drawings, we have only illustrated the drag bar and disk embodying the features of our improvement, and a portion of the support or draw rod of the main frame structure of a grain drill, and but two drag bars in series. The invention herein relating primarily to the means for controlling the position of the disks relative to each other of a series and independently as to the angularity of each disk relative to a vertical plane.

In some sections of the country it is desirable to cultivate the soil in connection with seeding. This can be done better in some soils with the disks set at an angle to the vertical. In hard soils, the disks will penetrate the ground better, and with less pressure, when set vertically. Different conditions of soil require different positions of the disks in order to obtain proper seed bed for the grain. It is, therefore, desirable to have means to adjust the entire set of disks on the grain drill readily and quickly.

1 represents the draw rod forming a part of the frame of the grain drill, to which the drag bars of a series are connected.

2 represents a yoke plate forming a depending hanger for individually supporting each drag bar of a series.

3 represents a clamp member straddling the draw rod, and bolted to the yoke plate by means of the bolts 4, which members are frictionally clamped to the draw rod to prevent lateral displacement.

5 represents a rod projected through the limbs of all of the yoke plates of the series, serving as a journal, and to which the drag bars 6 and their respective brace bars 7 are pivotally connected.

The pivoted ends of the drag bar and its brace bar are pivoted to the limbs of the yoke frame, preferably upon the outside thereof to prevent lateral displacement.

8 represents a disk journaled upon the disk-supporting frame 9, fixed to the free end of the drag bar. The journal may be of any form of construction common in the art.

10 represents a seed tube fixed to the disk-supporting frame 9 in any well-known manner.

The drag bar 6 is preferably of two-part form, having a member 11 adjustably connected to the member 6, with the member 11 providing the pivot end of the drag bar as a whole. As illustrated, the drag bar 6 is provided with a slot 12 extending in a plane with the length of the drag bar, whereby the length of the drag bar between the rod 5 and its brace connection can be varied and locked in such adjusted position by means of a bolt 13 projecting through the member 11 and slot 12 of member 7. This adjustment between the members of the drag bar varies the angle of the drag bar as a whole relative to its pivotal support adjusting the disk laterally, and thereby controlling the relative spacing of a series of disks. The pivot bores of the drag bar member 11 and brace bar 7 are preferably larger in diameter than the diameter of the pivot rod 5 which enables the adjustments to be made without straining the various members.

As illustrated in the drawings, the brace bar 7 is connected to the drag bar 6 by means of a rivet 14 connecting the two members at a definite point. This rivet connection is such as to provide a pivotal action between the drag bar member 6 and the brace bar 7, and the adjustment of one member relative to the other is made transverse to the longitudinal plane of the drag bar member 6. The swinging of one member upon the other produces an angular plane of adjustment of the drag bar relative to the horizontal plane of the supporting rod 5, which adjustments can be either to the right or left, as illustrated in Fig. 2, and the canting is accomplished in loosely fulcruming the drag and brace bars on the drag bar rod 5. This changes the angle of the disk relative to a vertical line, and provides an adjustment without increasing the cost of manufacture, or the number of parts.

The brace bar 7 is provided with a vertical slot 15 through which a bolt 16 projects, and through the drag bar member 6, for locking said members in any adjusted position. As it is unnecessary to change the length of connection of the brace bar to the drag bar from their pivotal points, a rivet is provided to insure a permanent connection, at the same time a pivotal one, it being obvious, however, that a bolt or other form of connection could be provided, which would serve as an axis upon the members relatively to change their degree of angularity from a vertical line.

With this improvement the several disks of a series are quickly and easily adjusted to change their positions relative to each other and also each disk independently relative to a vertical line to change its degree of angularity by an adjustment of the drag bar members upon and relative to themselves, without providing subsidiary elements to produce the various adjustments of each disk.

To understand the invention more thoroughly, the organization may be translated into a geometrical figure, that is to say, the components occupy the relative positions of the sides of the triangle, in which, the supporting or pivot bar represents one side, the two drag bar members longitudinally adjustably connected together represents a second side, and the brace bar represents the third side. Now, when the two drag bar members are adjusted relative to one another, it is evident that this side of the triangle is correspondingly shortened or lengthened and so changing the angle of the triangle without changing the brace bar connection with the drag bar, the result of which is that the furrow opener is thrown to one side or the other in a lateral direction.

Having described our invention, we claim:—

1. In a grain drill, the combination of a drag bar, a support to which the drag bar is pivotally mounted, a brace bar pivotally mounted on said support at one end, its opposite end adjustably connected to the drag bar, said brace bar provided with a slot lateral to the longitudinal plane of the drag bar, clamping means projecting through said slot and drag bar, for securing said members in any adjusted position relative to each other to provide an angular adjustment of the drag bar relative to its vertical plane.

2. In a grain drill, a drag bar, a brace bar therefor, a support upon which said members are mounted, said drag and brace bars adjustably and pivotally connected at a predetermined length from the support, with the connection adapting the members to be relatively canted to change the angle of the drag bar relative to a vertical plane, and means for clamping the same together.

3. In a grain drill, a drag bar, a brace bar therefor, a support upon which said members are pivotally mounted, said drag and brace bars connected at a predetermined length from the support, with the connection adapting the members to be relatively canted to change the angle of the drag bar relative to a vertical plane, means for clamping the same together, and means for varying the length of the drag bar between the brace bar connection and drag bar support for adjusting the drag bar to vary its line of travel.

4. In a grain drill, a drag bar, a brace bar therefor, a support on which said members are pivotally mounted, said drag and brace bars connected together at a point beyond the support with a connection adapting the members to be relatively canted to change the angle of the drag bar relative to a vertical plane, and means for clamping said members rigidly together.

In testimony whereof we have hereunto set our hands.

SYLVESTER H. JONES.
EDWARD CHRISTMAN.

Witnesses:
H. H. HUNTINGTON,
ALBERT E. SCHIRMEYER.